US011799531B2

(12) United States Patent
Taherzadeh Boroujeni et al.

(10) Patent No.: US 11,799,531 B2
(45) Date of Patent: Oct. 24, 2023

(54) GROUP-COMMON DOWNLINK CONTROL INFORMATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jelena Damnjanovic, Del Mar, CA (US); Juan Montojo, San Diego, CA (US); Iyab Issam Sakhnini, San Diego, CA (US); Peter Gaal, San Diego, CA (US); Xiaoxia Zhang, San Diego, CA (US); Jing Sun, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 17/210,402

(22) Filed: Mar. 23, 2021

(65) Prior Publication Data

US 2021/0336673 A1    Oct. 28, 2021

Related U.S. Application Data

(60) Provisional application No. 63/015,395, filed on Apr. 24, 2020, provisional application No. 63/015,361, filed on Apr. 24, 2020.

(51) Int. Cl.
*H04B 7/06* (2006.01)
*H04W 24/08* (2009.01)
(Continued)

(52) U.S. Cl.
CPC .......... *H04B 7/0626* (2013.01); *H04W 24/08* (2013.01); *H04W 72/046* (2013.01); *H04W 72/23* (2023.01); *H04W 72/542* (2023.01)

(58) Field of Classification Search
CPC ............ H04W 72/0413; H04W 72/042; H04L 5/0055; H04L 1/1861; H04L 1/0027; H04L 5/0057; H04L 1/0026
See application file for complete search history.

(56) References Cited

U.S. PATENT DOCUMENTS

| 10,200,185 B2 * | 2/2019 | You .................. H04W 76/28 |
| 2016/0157208 A1 * | 6/2016 | Liang ................ H04B 17/318 455/458 |

(Continued)

FOREIGN PATENT DOCUMENTS

WO    WO-2018228523 A1 * 12/2018    ........... H04L 1/0026

*Primary Examiner* — Kiet Tang
(74) *Attorney, Agent, or Firm* — Seyfarth Shaw LLP

(57) ABSTRACT

A method of wireless communication by a UE (user equipment) includes receiving group-common downlink control information (DCI) indicating coverage-enhancements including channel state information (CSI) report settings for a group of UEs and/or PDCCH repetition. The method also includes reporting CSI in accordance with the coverage-enhanced CSI report settings, which may include report repetition. A method of wireless communication by a base station includes transmitting group-common downlink control information (DCI) indicating coverage-enhanced channel state information (CSI) report settings and/or PDCCH repetition for a group of UEs. The method also includes receiving CSI reports from the group of UEs in accordance with the group-common DCI.

27 Claims, 14 Drawing Sheets

(51) Int. Cl.
*H04W 72/044* (2023.01)
*H04W 72/23* (2023.01)
*H04W 72/542* (2023.01)

(56) References Cited

U.S. PATENT DOCUMENTS

| | | | |
|---|---|---|---|
| 2016/0269986 A1* | 9/2016 | Bergström | H04W 48/08 |
| 2017/0118792 A1* | 4/2017 | Rico Alvarino | H04W 4/70 |
| 2017/0288808 A1* | 10/2017 | Blankenship | H04W 72/0446 |
| 2020/0178240 A1* | 6/2020 | Zhang | H04L 1/0026 |
| 2020/0280358 A1* | 9/2020 | Li | H04W 72/0446 |

* cited by examiner

GROUP-COMMON DOWNLINK CONTROL INFORMATION

CROSS-REFERENCE TO RELATED APPLICATIONS

The present application claims the benefit of U.S. Provisional Patent Application No. 63/015,395, filed on Apr. 24, 2020, and titled "GROUP-COMMON DOWNLINK CONTROL INFORMATION (DCI) INDICATING CHANNEL STATE INFORMATION (CSI) REPORT COVERAGE ENHANCEMENT," and U.S. Provisional Patent Application No. 63/015,361, filed on Apr. 24, 2020, and titled "GROUP-COMMON DCI INDICATING PDCCH MONITORING AGGREGATION," the disclosures of which are expressly incorporated by reference in their entireties.

FIELD OF THE DISCLOSURE

Aspects of the present disclosure generally relate to wireless communications, and more particularly to techniques and apparatuses for group-common downlink control information (DCI) for indicating channel state information (CSI) report coverage enhancement or physical downlink control channel (PDCCH) monitoring aggregation.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Wireless communication between a user equipment (UE) and a base station may benefit from beamforming. Beam reliability may be necessary to ensure that adequate coverage is provided for unicast channels between the UE and the base station, such as in Frequency Range 2 (FR2). For example, beam reliability may suffer for a variety of reasons, such as a narrow beam becoming weak or suffering from partial shadowing. Improvements are presented to address beam reliability issues for the UE. These improvements may also be applicable to other multi-access technologies and the telecommunication standards that employ these technologies.

SUMMARY

According to an aspect of the present disclosure, a method of wireless communication by a UE (user equipment) includes receiving group-common downlink control information (DCI) indicating coverage-enhanced channel state information (CSI) report settings for a group of UEs. The method also includes reporting CSI in accordance with the coverage-enhanced CSI report settings.

According to another aspect of the present disclosure, a method of wireless communication by a base station includes transmitting group-common downlink control information (DCI) indicating coverage-enhanced channel state information (CSI) report settings for a group of UEs. The method also includes receiving CSI reports from the group of UEs in accordance with the group-common DCI.

According to yet another aspect of the present disclosure, a method of wireless communication at a user equipment (UE) includes receiving group-common downlink control information (DCI). The DCI includes an indication for a coverage-enhanced procedure for a group of one or more UEs including the UE for physical downlink control channel (PDCCH) monitoring. The method also includes determining whether to monitor for a PDCCH according to the coverage-enhanced procedure based on the indication.

According to still other aspects of the present disclosure, a method of wireless communication at a base station includes transmitting a group-common downlink control information (DCI). The DCI includes an indication for a coverage-enhanced procedure for a group of one or more user equipment (UEs) for physical downlink control channel (PDCCH) monitoring. The method also includes transmitting one or more repetitions of a PDCCH based on the coverage-enhanced procedure over multiple monitoring occasions.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
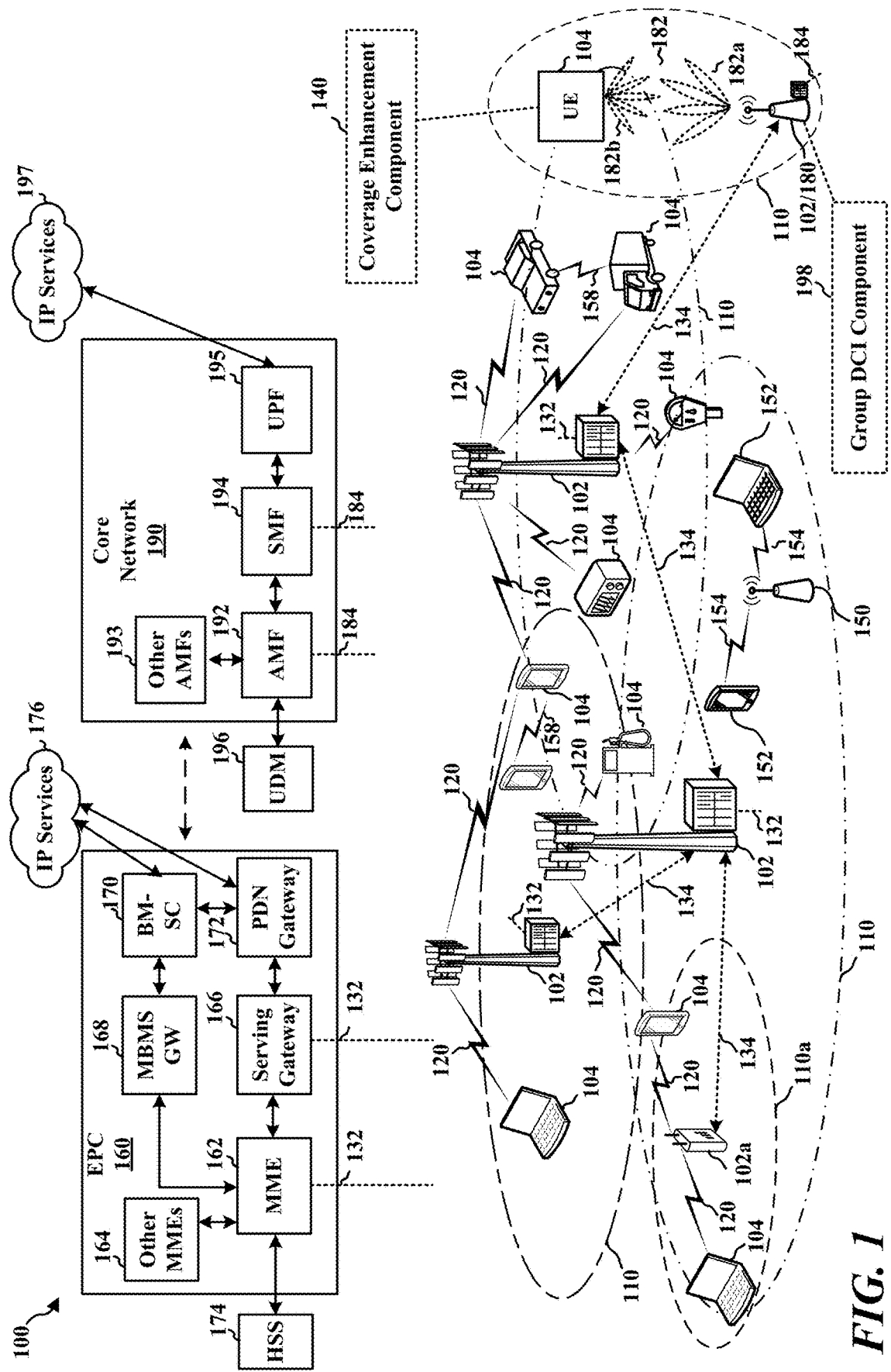
FIG. 1 is a diagram illustrating an example of a wireless communications system and an access network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

It should be noted that while aspects may be described using terminology commonly associated with 5G and later wireless technologies, aspects of the present disclosure can be applied in other generation-based communications systems, such as and including 3G and/or 4G technologies.

Wireless communication between a user equipment (UE) and a base station may involve beamforming. Beam reliability may be necessary to ensure that adequate coverage is provided for unicast channels between the UE and the base station, such as in Frequency Range 2 (FR2). For example, beam reliability may suffer for a variety of reasons such as a narrow beam becoming weak or suffering from partial shadowing. In addition, it is also important for the base station to obtain reliable channel state information (CSI) feedback from the UE so that the base station can provide new beam assignments to ensure that the UE can properly connect to the base station. Conditions that affect one UE, such as a narrow cast beam becoming weak or suffering from partial shadowing, may affect a group of UEs that share the same, or a related, refined beam. UEs that are associated with different refined beams of a wider beam may also suffer similar kinds of beam-related problems. For example, a passing bus may result in attenuation or blockage for a group of UEs that are associated with different refined beams in correlated time spans.

A base station may transmit repetitions of a physical downlink control channel (PDCCH) in an aggregated set of multiple monitoring occasions to alleviate beam reliability issues and to aid the UE in successfully receiving the PDCCH. Each aggregated set of monitoring occasions may be allocated with one or more control channel elements (CCE) and an aggregation level may indicate the number of CCEs allocated. The transmission of repetitions of the PDCCH in the aggregated set of monitoring occasions may be referred to as an "enhanced-coverage PDCCH" procedure. However, the added repetitions of the PDCCH over multiple monitoring occasions may consume additional resources and may not be necessary or useful for UEs experiencing good coverage. Therefore, aspects presented provide for efficient signaling to enable PDCCH coverage enhancement, for example, utilizing repetitions of PDCCH over aggregated sets of monitoring occasions, for a group of UEs that may be suffering from weak or worsening beams.

Various implementations relate generally to a coverage-enhanced procedure for PDCCH monitoring. In some aspects, a base station transmits multiple repetitions of a PDCCH in multiple monitoring occasions and the UE monitors for each of the multiple repetitions. In some examples, the base station transmits an indication regarding the coverage-enhanced procedure in group-common downlink control information (DCI). In some examples, the base station preconfigures a coverage-enhanced procedure for PDCCH monitoring such that it may dynamically indicate to a group of UEs to activate, deactivate, or continue the coverage-enhanced procedure through group-common DCI. Responsive to receiving the group-common DCI, a UE may determine whether to monitor for a PDCCH according to the coverage-enhanced procedure based on the indication in the group-common DCI. In some implementations, the indication in the group-common DCI indicates the coverage-enhanced procedure is to be used for all configured search spaces for the UE. In some other implementations, the indication in the group-common DCI indicates the coverage-enhanced procedure is to be used for a subset of search spaces for the UE.

Other aspects of the present disclosure relate to coverage enhancement of a channel state information (CSI) report for a group of UEs that suffer from a weak or worsening beam. The signaling for the coverage enhancement incurs little overhead. According to the present disclosure, group-common downlink control information (DCI) may indicate coverage-enhanced CSI report settings for a group of UEs. In one example, the coverage-enhanced CSI report settings indicate a repetition of CSI reports.

Particular implementations of the subject matter described in this disclosure can be implemented to realize one or more of the following potential advantages. In some implementations, the described techniques can be used to enable a coverage-enhanced procedure with UEs to ensure UEs that suffer from beam-related problems will have appropriate coverage without excessive signaling overhead.

Several aspects of telecommunication systems will now be presented with reference to various apparatuses and methods. These apparatuses and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system 100 (also referred to as a wireless wide area network (WWAN)) includes base stations 102, UEs 104, an evolved packet core (EPC) 160, and another core network 190 (e.g., a 5G core (5GC)). The base stations 102 may include macrocells (e.g., high power cellular base stations) or small cells (e.g., low power cellular base stations, including femtocells, picocells, and microcells).

The base stations 102 configured for 4G LTE (collectively referred to as evolved universal mobile telecommunications system (UMTS) terrestrial radio access network (E-UTRAN)) may interface with the EPC 160 through first backhaul links 132 (e.g., an S1 interface). The base stations 102 configured for 5G NR (collectively referred to as next generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, a small cell 102a may have a coverage area 110a that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). Communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links 120 may be through one or more carriers. The base stations 102/UEs 104 may use spectrum up to Y MHz (e.g., 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using a device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (e.g., macro base station), may include or be referred to as an eNB, gNodeB (gNB), or another type of base station. Some base stations, such as a gNB 180, may operate in a traditional sub-6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) have extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions 182a. The base station 180 may receive the beamformed signal from the UE 104 in one or more receive directions 182b. The base station 180/UE 104 may perform beam training to determine the best receive and transmit directions 182b, 182a for each of the base station 180/UE 104. The transmit and receive directions 182a, 182b for the base station 180 may or may not be the same. The transmit and receive directions 182a, 182b for the UE 104 may or may not be the same.

The EPC 160 may include a mobility management entity (MME) 162, other MMES 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to IP services 176. The IP services 176 may include the Internet, an intranet, an IP multimedia subsystem (IMS), a PS streaming service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to IP services 197. The IP services 197 may include the Internet, an intranet, an IP multimedia subsystem (IMS), a PS streaming service, or other IP services.

The base station 102 may include or be referred to as a gNB, Node B, eNB, an access point, a base transceiver station, a radio base station, a radio transceiver, a transceiver function, a basic service set (BSS), an extended service set (ESS), a transmit and receive point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as Internet of things (IoT) devices (e.g., parking meter, gas pump, toaster, vehicle, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include a coverage enhancement component 140. The coverage enhancement component 140 may be configured to receive a group-common DCI from the base station 102/180 including an indication for a coverage-enhanced PDCCH monitoring procedure for a group of one or more UEs including the UE 104. The coverage enhancement component 140 may be configured to determine whether to monitor for a PDCCH according to the coverage-enhanced procedure based on the indication.

In some aspects, one or more base stations 102/180 may include a group DCI component 198 configured to transmit a group-common DCI including an indication for a coverage-enhanced procedure for PDCCH monitoring for multiple UEs. The indication may indicate to the group of UEs to start monitoring for the PDCCH based on the coverage-enhanced procedure, to stop monitoring for the PDCCH based on the coverage-enhanced procedure, or to continue monitoring for the PDCCH based on the coverage-enhanced procedure. The base station 102/180 may be configured to transmit one or more repetitions of a PDCCH over multiple monitoring occasions based on the coverage-enhanced procedure.

Although the description may be focused on 5G NR, the concepts described herein may be applicable to other similar areas, such as LTE, LTE-A, CDMA, GSM, and other later wireless technologies.

Figure 2:
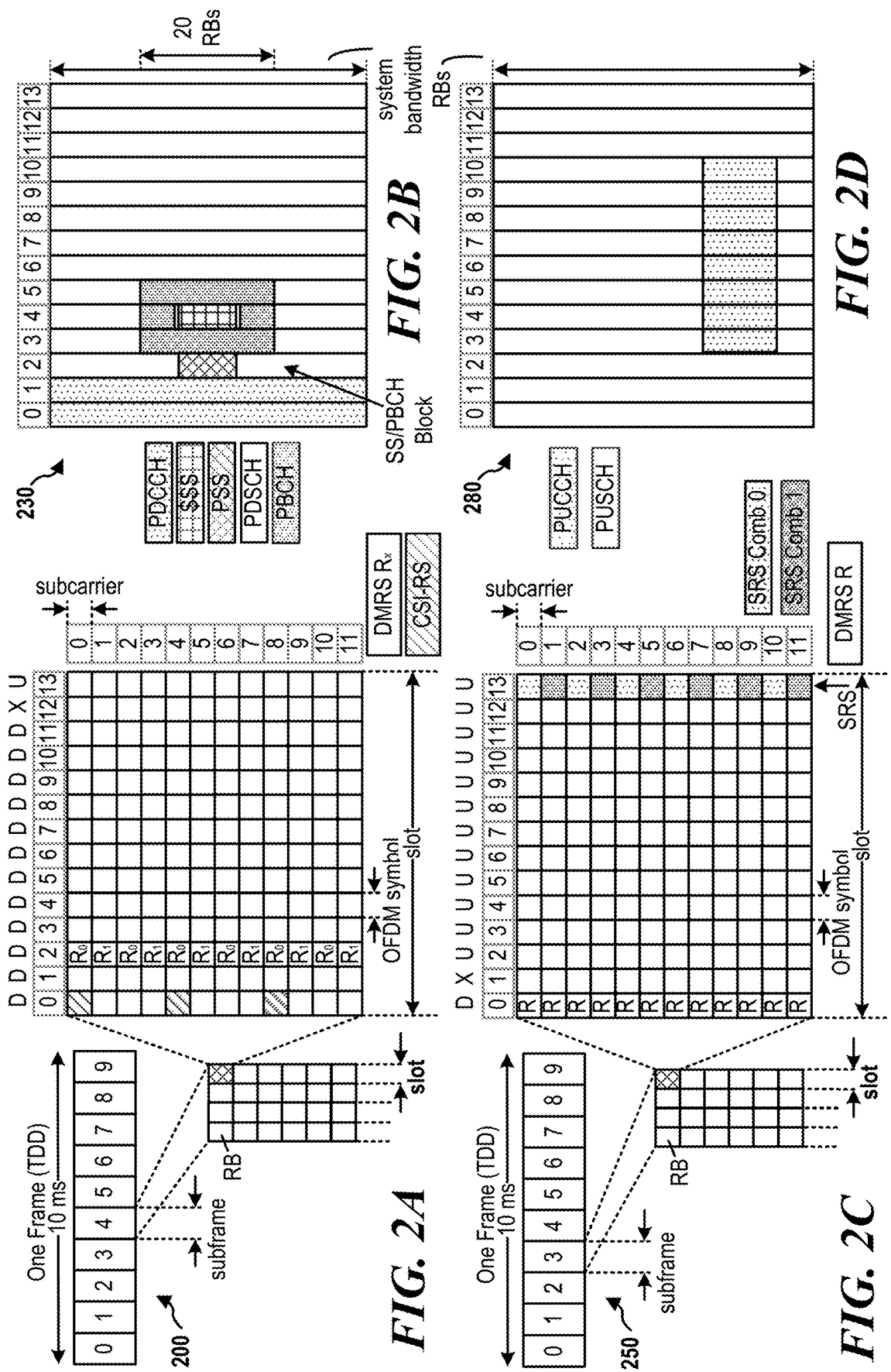
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (e.g., carrier system bandwidth), subframes within the set of subcarriers are dedicated for both DL and UL. In the examples provided by FIGS. 2A and 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), or UCI.

Figure 3:
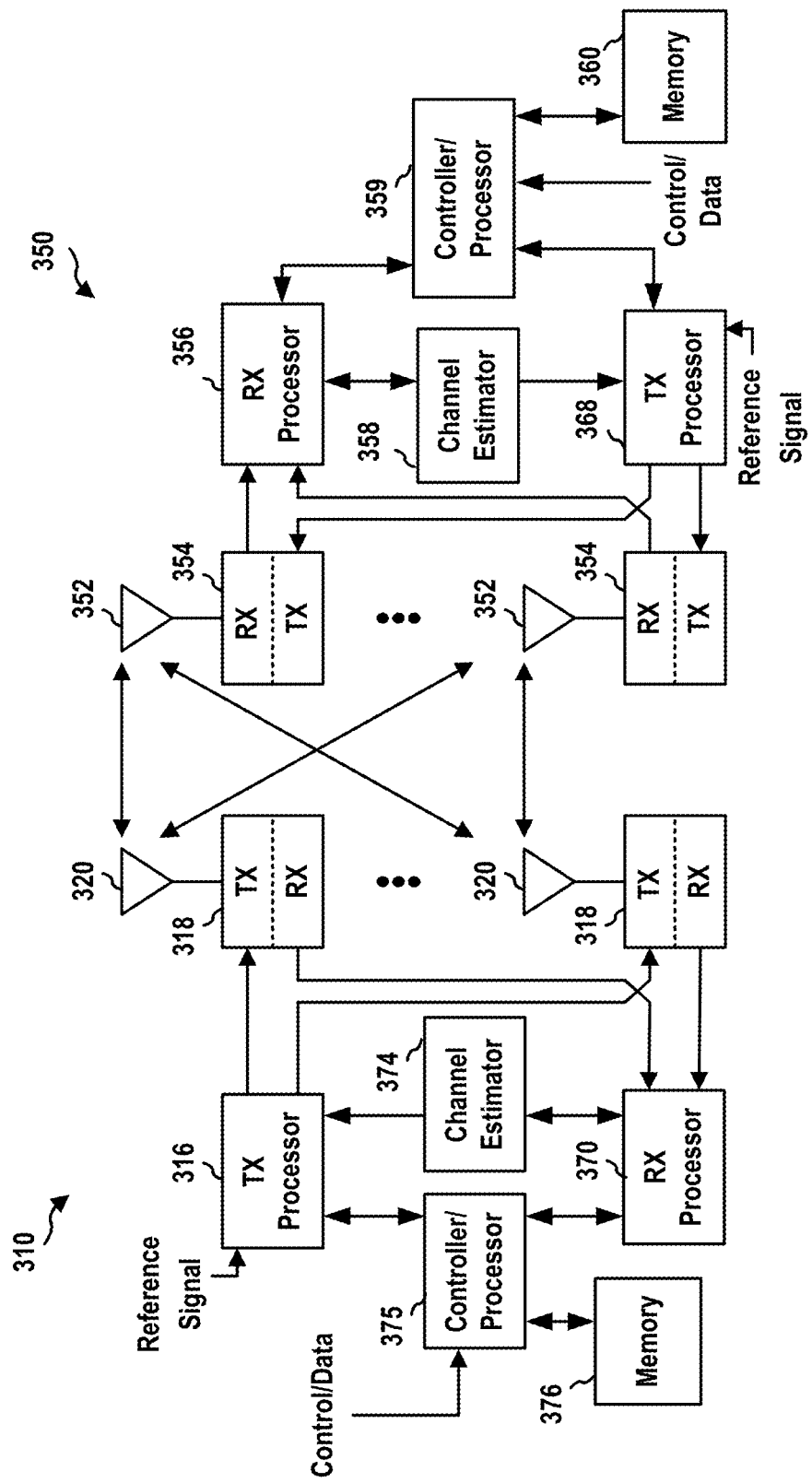
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

A transmit (TX) processor 316 and a receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to a receive (RX) processor 356. A transmit (TX) processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the coverage enhancement component 140 of FIG. 1.

At least one of the TX processor 316, the RX processor 370, and the controller/processor 375 may be configured to perform aspects in connection with the group DCI component 198 of FIG. 1.

Figure 4:
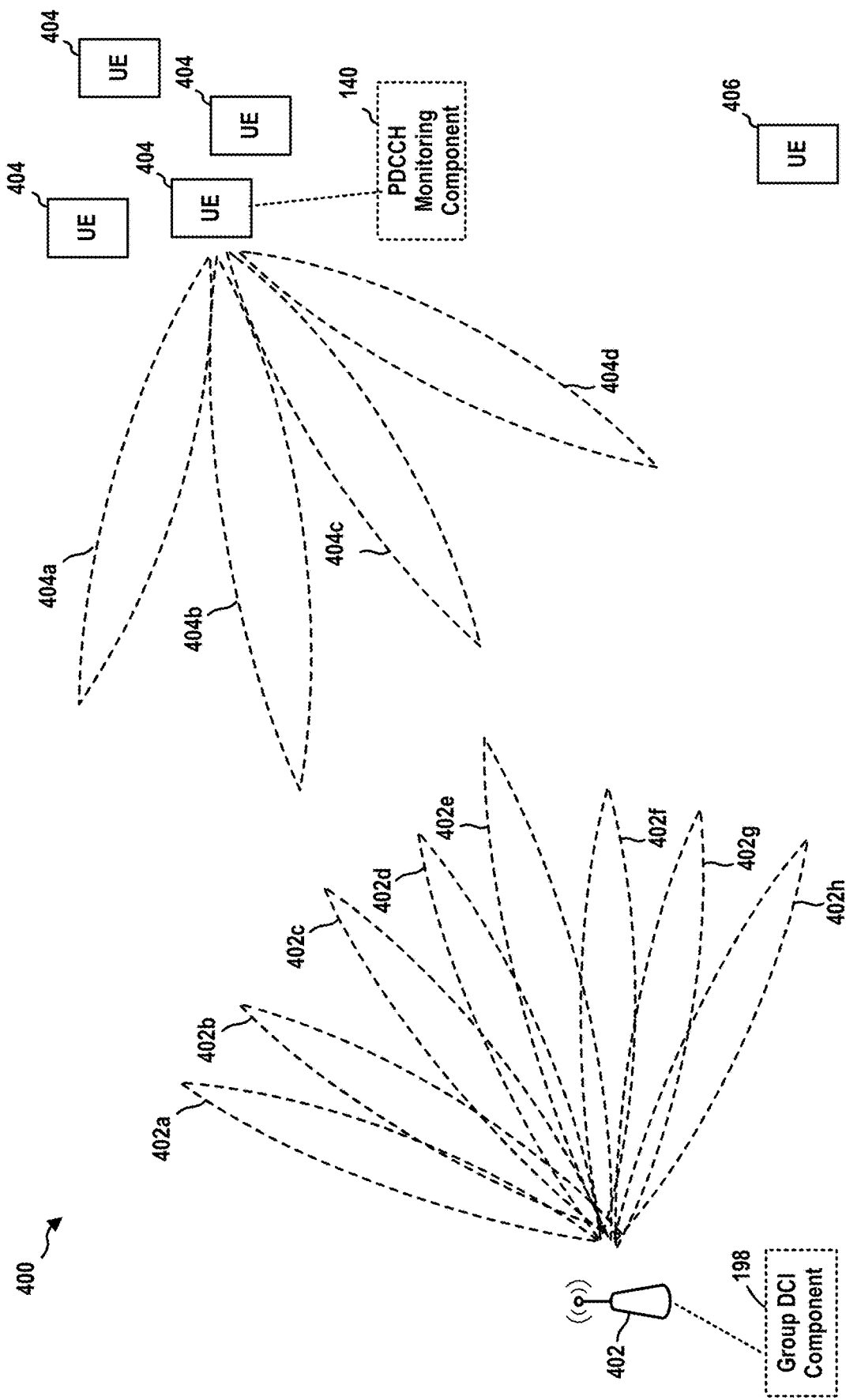
FIG. 4 shows a diagram illustrating an example of beamforming between a base station and a UE in an access network, in accordance with various aspects of the present disclosure.

FIG. 4 shows a diagram illustrating an example of beamforming 400 between a base station 402 and a UE 404 in an access network, in accordance with various aspects of the present disclosure. As illustrated in FIG. 4, the base station 402 may transmit signals to the UE 404 in each of multiple directions using respective transmit beams 402a, 402b, 402c, 402d, 402e, 402f, 402g, 402h. The UE 404 may receive signals from the base station 402 using different receive beams 404a, 404b, 404c, 404d. The UE 404 may also transmit a signal to the base station 402 in one or more of the directions using different beams 404a-404d. The base station 402 may receive the signal from the UE 404 in one or more of the receive directions using the one or more beams 402a-402h. The base station 402 and UE 404 may perform beam training to determine the best receive and transmit directions for each of the base station 402 and UE 404. The transmit and receive directions for the base station 402 may or may not be the same. The transmit and receive directions for the UE 404 may or may not be the same. The base station 402 may use the same beam, or related beams, to transmit communication to multiple UEs 404. The base station 402 may use a different beam to exchange communication with a UE 406, for example. The base station 402 may provide reference signals to the UE 404 so that the UE may perform further refined selection of the beam pairs 402a/404a, 402c/404c, 402d/404d based on measurements performed on those signals.

Under some conditions, PDCCH messages may not be received correctly, which may delay or prevent the UE 404 from receiving the control information in the PDCCH and exchanging other communications including data (e.g., via a PDSCH) with the base station 402. For example, beam reliability may suffer for a variety of reasons, such as a narrow beam becoming weak or suffering from partial shadowing. The base station 402 may use channel state information (CSI) feedback from the UEs 404 or 406 to determine if current beam assignments are reliable and to ensure that the UEs 404 can properly receive communications from the base station 402. Conditions that affect one UE 404, such as a narrow beam becoming weak or suffering from partial shadowing, may affect some or all other UEs in a group of UEs 404 that share the same refined beam or a related refined beam. Beam refinement may include the use of one or more wider beams to select a narrower beam for communication. For example, the UEs 404 that are associated with different refined beams of a wider beam may also suffer similar types of beam-related problems. For example, a passing vehicle or other mobile structure may cause interference, attenuation, or blockage for a group of UEs 404 associated with different refined beams in correlated time spans.

The base station may alleviate issues with beam reliability by transmitting a PDCCH using an enhanced procedure that involves transmitting multiple repetitions of the PDCCH over an aggregated set of multiple monitoring occasions. The enhanced PDCCH procedure is also referred to as a "coverage-enhanced" PDCCH procedure or an "enhanced" PDCCH procedure. However, the added repetitions for the PDCCH may consume additional resources and may not be necessary or useful for UEs that are experiencing good coverage. Aspects presented enable the base station to balance the efficient use of resources with improving beam reliability, and to do so with minimal signaling to the UEs.

The base station 402 may include a group DCI component 198, such as described in connection with FIG. 1. The group DCI component 198 generates an indication regarding a coverage-enhanced procedure for PDCCH monitoring that the base station 402 then transmits to a group of UEs 404 in group-common DCI. The UEs 404 may each include a coverage enhancement component 140, such as described in connection with FIG. 1, which enables the UE to determine an action to take regarding PDCCH monitoring according to a coverage-enhanced PDCCH monitoring procedure.

The base station 402 may determine to transmit the group-common DCI that indicates a preconfigured coverage-enhanced procedure for PDCCH monitoring based on one or more of: channel state information (CSI) received from at least one UE 404 in the group of UEs 404, a quality measurement for at least one UE 404 in the group of UEs 404, or hybrid automatic repeat request (HARQ) feedback from at least one UE 404 in the group of UEs 404. For example, the base station 402 may have previously received channel state information, quality measurements, or HARQ feedback from another UE 404 and determine to transmit the group-common DCI to the UE 404 based on this previously received information, measurements or feedback. The base station 402 may indicate the coverage-enhanced PDCCH procedure for all or a subset of search spaces of the group of UEs 404. Additionally, the base station 402 may configure whether to activate coverage-enhance PDCCH procedures separately for each search space. For example, the base station 402 may configure the coverage-enhanced PDCCH monitoring procedure to include one or more of an aggregation level or a size for PDCCH monitoring, a time window, a repetition pattern for the PDCCH, etc.

Under the preconfigured coverage-enhanced procedure for PDCCH monitoring, the base station 402 may transmit an initial transmission of a PDCCH and may repeat the PDCCH transmission as one or more repetitions so that the same PDCCH is repeated over two or more PDCCH monitoring occasions. The two or more PDCCH monitoring occasions may be grouped together as an aggregated set of monitoring occasions. The same PDCCH may be repeated over PDCCH candidates in multiple monitoring occasions, for example, in the same search space and with the same PDCCH candidate index. In an implementation, the base station 402 may repeat the PDCCH transmission using different refined beams. In some examples, the different refined beams may each be a sub-beam of a beam corresponding to a transmission of the PDCCH. A sub-beam may refer to a lower level beam in a hierarchical set of beams. For example, a layer 1 (L1) beam may cover multiple L2 beams, which may each cover multiple L3 beams. In an implementation, the beam corresponding to a transmission of the PDCCH is an L2 beam and each of the different refined beams may be an L3 beam.

Each aggregated set of monitoring occasions may include k consecutive PDCCH monitoring occasions that correspond to the same search space. In some examples, each monitoring occasion may belong to a single aggregated set of monitoring occasions. For example, the aggregated set of monitoring occasions may be associated with an index n and may include monitoring occasions {4n, 4n+1, 4n+2, 4n+3}. In this example, for the aggregated set of monitoring occasions for n=0, the monitoring occasions include {0, 1, 2, 3}. For the aggregated set of monitoring occasions for n=1, the monitoring occasions include {4, 5, 6, 7}. For the aggregated set of monitoring occasions for n=2, the monitoring occasions include {8, 9, 10, 11}. Thus, each of the individual monitoring occasions belongs to only a single aggregated set of monitoring occasions, and the monitoring occasions in different aggregated sets of monitoring occasions do not overlap. In some other examples, a single monitoring occasion may belong to multiple aggregated sets of monitoring occasions. For example, the aggregated set of monitoring occasions may be associated with an index n and may include monitoring occasions {n, n+1, n+2, n+3}. In this example, for the aggregated set of monitoring occasions for n=0, the monitoring occasions include {0, 1, 2, 3}. For the aggregated set of monitoring occasions for n=1, the monitoring occasions include {1, 2, 3, 4}. For the aggregated set of monitoring occasions for n=2, the monitoring occasions include {2, 3, 4, 5}. Thus, monitoring occasion 2 and monitoring occasion 3 belong to the aggregated sets of monitoring occasions for n=0, n=1, and n=2. Similarly, monitoring occasion 4 belongs to the aggregated sets of monitoring occasions for n=1 and n=2.

Figure 5:
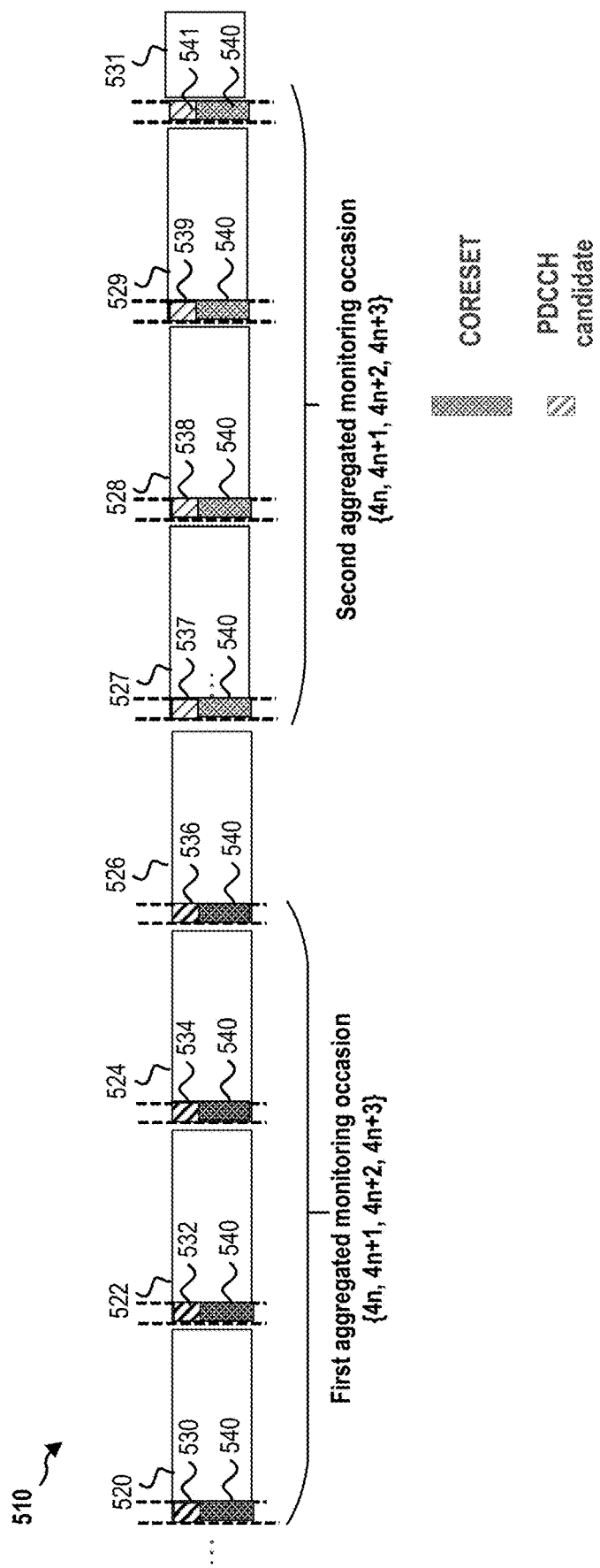
FIG. 5 shows a diagram illustrating example aggregated sets of monitoring occasions that are non-overlapping, in accordance with various aspects of the present disclosure.

FIG. 5 shows a diagram illustrating example aggregated sets of monitoring occasions 510 that are non-overlapping, in accordance with various aspects of the present disclosure. A first aggregated set of monitoring occasions includes the monitoring occasions in slots 520, 522, 524, and 526. The base station 402 may transmit the same PDCCH over one or more of the monitoring occasions. For example, the base station 402 may transmit the PDCCH on a PDCCH candidate 530 in a core resource set (CORESET) 540 of slot 520, and may transmit repetitions of the PDCCH in PDCCH candidates 532, 534, and 536 in the CORESET 540 of slots 522, 524, and 526. That is, each of the PDCCH candidates 530, 532, 534, and 536 may include the same PDCCH. Although four slots are illustrated, the aspects presented may be applied to an aggregated set of any number of consecutive monitoring occasions.

A second aggregated set of monitoring occasions includes the monitoring occasions in slots 527, 528, 529, and 531. The base station 402 may transmit the same PDCCH over one or more of the multiple monitoring occasions. For example, the base station 402 may transmit the PDCCH on a PDCCH candidate 537 in a CORESET 540 and may transmit repetitions of the PDCCH in PDCCH candidates 538, 539, and 541 in the CORESET 540 of slots 528, 529, and 531. That is, each PDCCH candidate 537, 538, 539, and 541 may include the same PDCCH.

Figure 6:
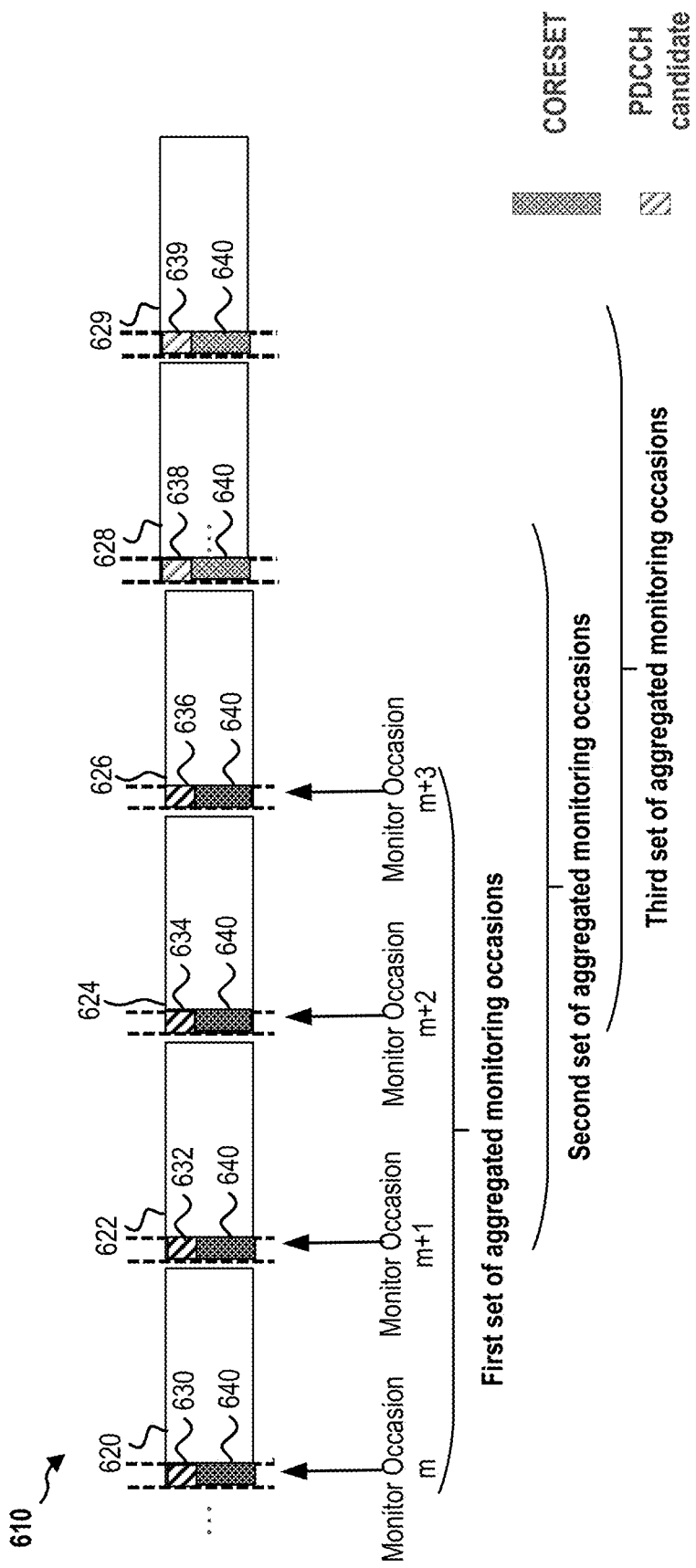
FIG. 6 shows a diagram illustrating example aggregated sets of monitoring occasions that are overlapping, in accordance with various aspects of the present disclosure.

FIG. 6 is a another diagram illustrating an example of overlapping of aggregated sets of monitoring occasions 610, in accordance with various aspects of the present disclosure. A first aggregated set of monitoring occasions includes the consecutive monitoring occasions in slots 620, 622, 624, and 626 in candidates 630, 632, 634, and 636 of a CORESET 640. A second aggregated set of monitoring occasions includes the consecutive monitoring occasions in slots 622, 624, 626, and 628 in candidates 632, 634, 636, and 638 in the CORESET 640. A third aggregated set of monitoring occasions includes the consecutive monitoring occasions in slots 624, 626, 628, and 629 in candidates 634, 636, 638, and 639 of the CORESET 640. As illustrated, individual monitoring occasions may belong to multiple aggregated sets of monitoring occasions. As an example, the aggregated sets of monitoring occasions may be based on {m, m+1, m+2, m+3}, which leads to some monitoring occasions belonging to multiple sets.

Figure 7:
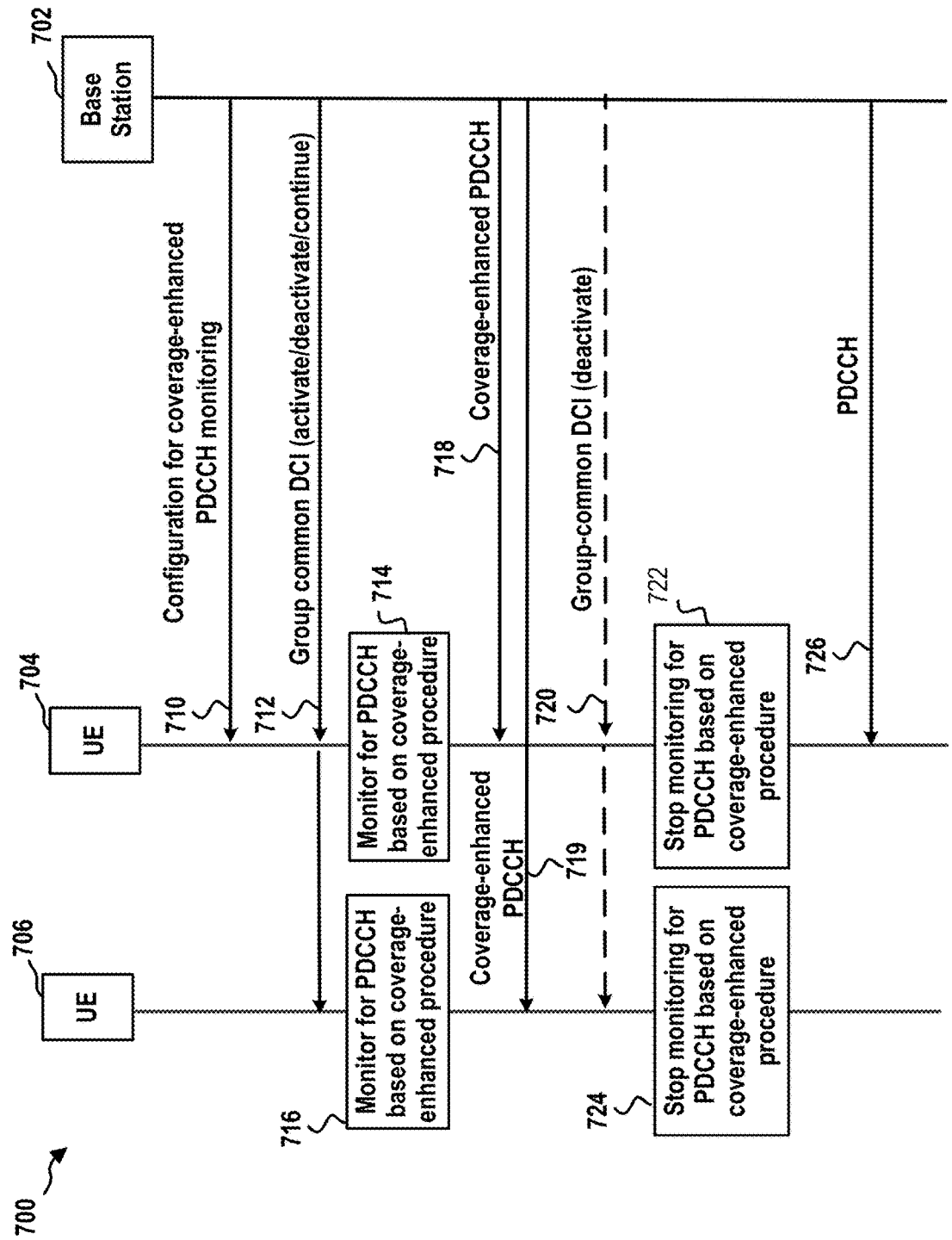
FIG. 7 is a call flow diagram for a base station and a group of UEs that supports a coverage-enhanced procedure for physical downlink control channel (PDCCH) monitoring, in accordance with various aspects of the present disclosure.

FIG. 7 is a call flow diagram 700 for a base station 702 and a group of UEs (e.g., including at least a UE 704 and a UE 706) that supports that supports a coverage-enhanced procedure for PDCCH monitoring, in accordance with various aspects of the present disclosure. As illustrated in FIG. 7, the base station 702 transmits a configuration 710 for coverage-enhanced procedures for PDCCH monitoring to UE 704 and UE 706. In some examples, the UE 706 may be preconfigured with the configuration 710 using a different mechanism. The configuration 710 may include one or more of an aggregation level or a data size associated with the associated with an aggregated set of monitoring occasions in which the UE 704, 706 is to monitor for the PDCCH. The configuration 710 may further include a duration, a repetition pattern, or other information about the aggregated set of monitoring occasions. In some examples, on the UE side, the coverage-enhanced PDCCH monitoring procedure may include monitoring for a same PDCCH over multiple PDCCH candidates in multiple respective monitoring occasions in a same search space with a same PDCCH candidate index.

The base station 702 transmits group-common DCI 712 including an indication regarding the coverage-enhanced PDCCH monitoring procedure. In some aspects, the indication in the group-common DCI 712 indicates an activation, deactivation, or continuation of the coverage-enhanced procedure for PDCCH monitoring. At blocks 714 and 716, the UEs 704 and 706 independently determine whether to monitor for PDCCH according to the coverage-enhanced procedure based on their respective configurations and conditions. For example, if the group-common DCI 712 activates or continues the coverage-enhanced PDCCH monitoring procedure, the UEs 704 and 706 may monitor for the PDCCH based on the coverage-enhanced procedure and the configuration 710. In some examples, UEs 704 and 706 may suffer different degrees of weak or worsening beam reliability and may determine whether to activate the coverage-enhanced procedure for PDCCH monitoring based on their respective beam reliabilities and configurations.

The base station 702 may transmit a coverage-enhanced PDCCH 718 to the UE 704 and a coverage-enhanced PDCCH 719 to the UE 706 including repetitions of the same PDCCH over aggregated set of monitoring occasions based on the configuration 710. Each aggregated set of monitoring occasions includes two or more PDCCH monitoring occasions. In some examples, each aggregated set of monitoring occasions includes k consecutive PDCCH monitoring occasions corresponding to the same search space. In some such examples, each monitoring occasion may belong to a single aggregated set of monitoring occasions, such as illustrated and described with reference to FIG. 5. In some other examples, a monitoring occasion may belong to multiple aggregated sets of monitoring occasions, such as illustrated and described with reference to FIG. 6.

In some examples, the base station 702 may transmit group-common DCI 720 including an indication of deactivation of a coverage-enhanced procedure for PDCCH monitoring. Responsive to receiving such a deactivation indication, the UEs 704 and 706 may stop monitoring for the PDCCH based on the coverage-enhanced procedure in blocks 722 and 724. Additionally or alternatively, in some examples, the UEs 704 and 706 may stop monitoring for the PDCCH based on the coverage-enhanced procedure in blocks 722 and 724 after a timer for the coverage-enhanced procedure for PDCCH monitoring expires.

The base station 702 may transmit a second PDCCH 726 without the coverage-enhanced procedure after deactivating the coverage-enhanced procedure for PDCCH. The PDCCH 726 may be transmitted without repetition and the procedure of monitoring the PDCCH 726 may be referred to as a "regular PDCCH monitoring procedure."

In some other examples, the indication in the group-common DCI 712 may indicate that the coverage-enhanced PDCCH procedure is possible. For example, in response to receiving the group-common DCI 712, the UEs 704 and 706 may perform PDCCH blind detection associated with both the coverage-enhanced procedure and a second procedure (such as a non-coverage-enhanced procedure or a procedure that does not involve transmitting repetitions of the PDCCH in multiple monitoring occasions). If the UE 704 or 706 surpasses a blind detection limit, the UE may stop one of the blind detection options, such as by dropping the blind detection for the regular PDCCH procedure. For example, the UE 704 or 706 may stop the blind detection of the second PDCCH in response to determining that a total number of blind decodes or an amount of covered control channel elements (CCEs) satisfies blind detection limit or threshold. The threshold or limit may be configured for the UE 704 or 706 in the configuration 710.

Figure 8A:
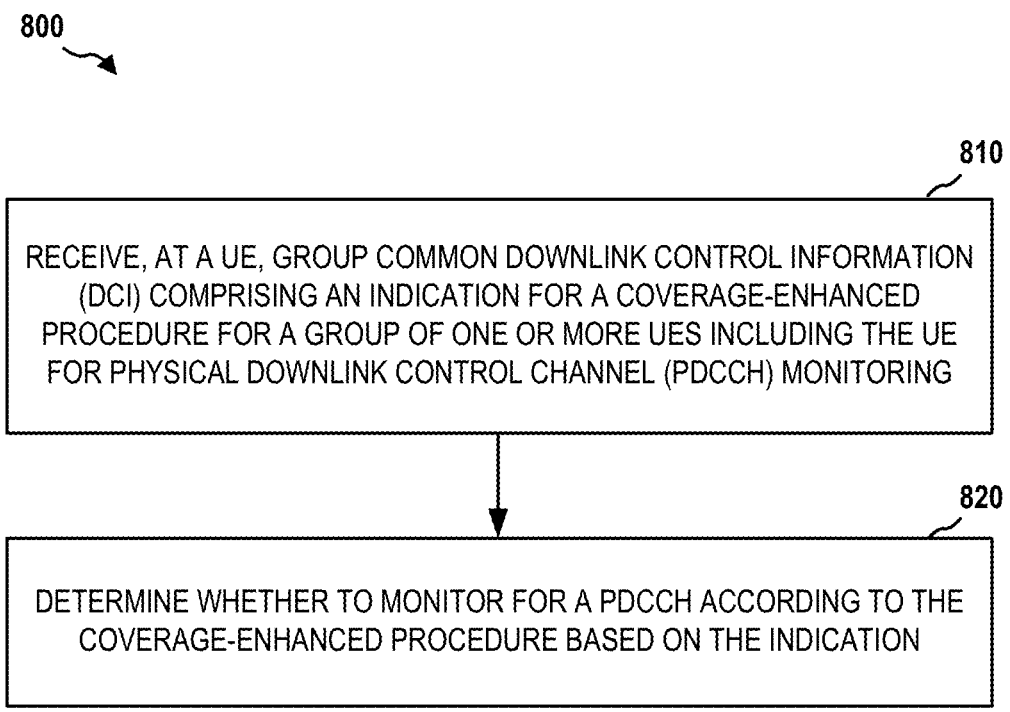
FIGS. 8A and 8B show flowcharts illustrating example methods performed by a UE that support a coverage-enhanced procedure for PDCCH monitoring, in accordance with various aspects of the present disclosure.
Figure 8B:
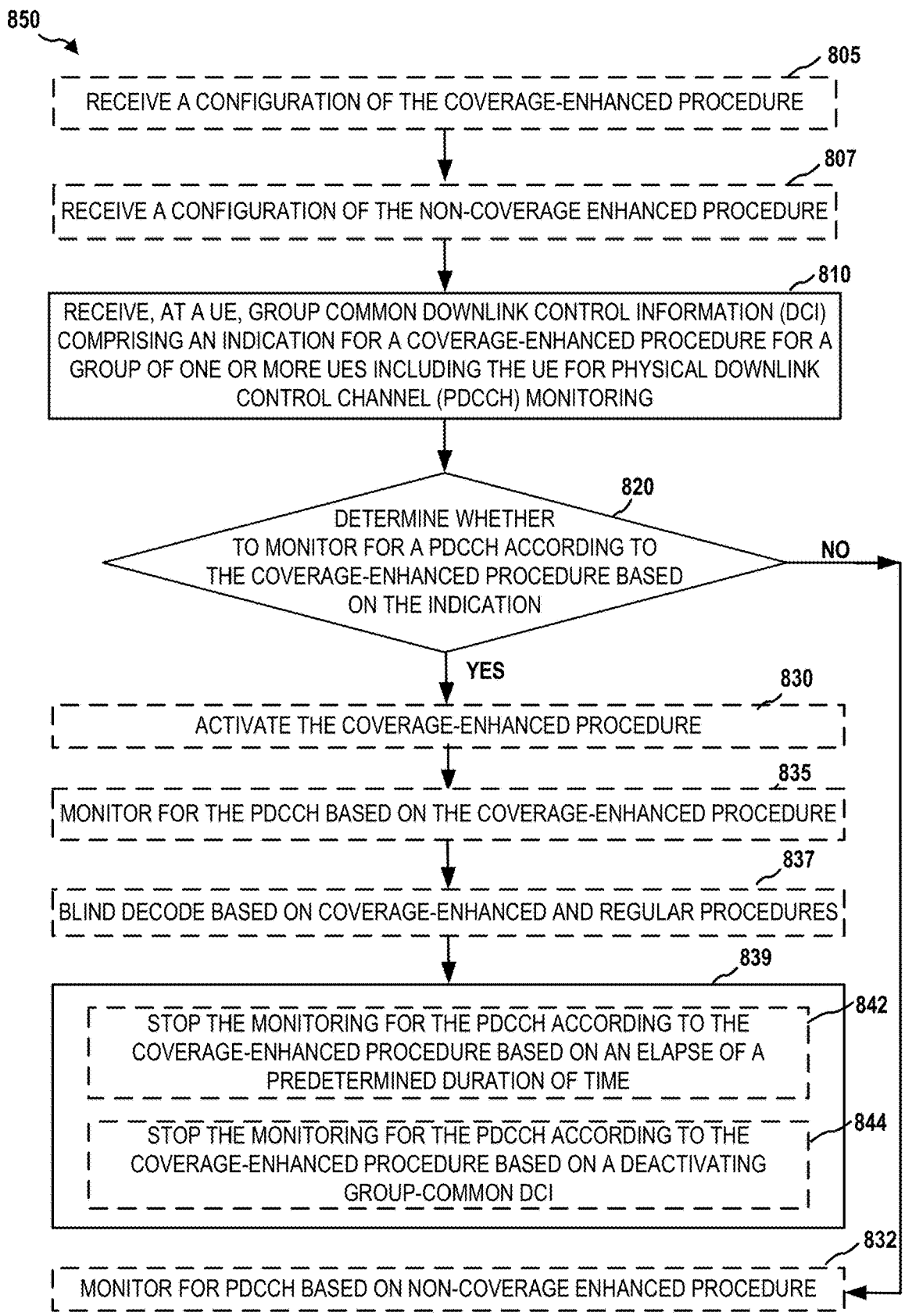

FIGS. 8A and 8B are flowcharts illustrating example methods 800 and 850 of wireless communication for a UE that supports coverage-enhanced procedures for PDCCH monitoring, in accordance with various aspects of the present disclosure. The methods 800 and 850 may be performed by a UE or a component of a UE (such as the UE 104, 350, 404, 704, or 706; a processing system, which may include the memory 360 and which may be the entire UE 350 or a component of the UE 350, such as the TX processor 368, the RX processor 356, or the controller/processor 359). Optional aspects are illustrated with a dashed line. The methods 800 and 850 illustrated in FIGS. 8A and 8B may be performed by a UE in communication with a base station (such as the base station 102, 180, 310, 402, or 702). The methods 800 and 850 may allow the UE to monitor for a PDCCH according to a coverage-enhanced procedure based on an indication in a group-common DCI.

As illustrated in block 810 of FIG. 8A, a UE receives group-common downlink control information (DCI) including an indication for a coverage-enhanced procedure for a group of one or more UEs including the UE for physical downlink control channel (PDCCH) monitoring. The indication may indicate the coverage-enhanced PDCCH monitoring procedure for all of the search spaces for the UE. In another example, the indication may indicate the coverage-enhanced procedure for a subset of search spaces of the UEs. The indication may include any of the aspects described in connection with FIG. 4 or the group-common DCI 712 in FIG. 7, for example.

As illustrated in block 820 of FIG. 8A, the UE determines whether to monitor for a PDCCH according to the coverage-enhanced procedure based on the indication. For example, the UE may determine to monitor for the PDCCH according to the coverage-enhanced procedure, as described in connection with group-common DCI 712 and block 716 in FIG. 7. In some examples, the UE may determine to stop monitoring for the PDCCH according to the coverage-enhanced procedure, as described in connection with blocks 722 and 724 of FIG. 7.

FIG. 8B shows an example method 850 that includes blocks 810 and 820 of FIG. 8A and includes additional optional aspects. For example, as illustrated at block 805, the UE may receive a configuration of the coverage-enhanced procedure prior to receiving the group-common DCI. For example, the configuration may include any of the example aspects described in connection with the configuration 710 in FIG. 7 or the configuration described in connection with FIG. 4.

As illustrated in block 830, if the UE determines, at block 820, to monitor for a PDCCH according to the coverage-enhanced procedure based on the indication in the group-common DCI, the UE may activate the coverage-enhanced procedure for PDCCH monitoring and monitor, at block 835, for the PDCCH based on an aggregated sets of monitoring occasions. Each aggregated set of monitoring occasions may include repetition of the same PDCCH over two or more PDCCH monitoring occasions. A PDCCH may be repeated over PDCCH candidates in multiple monitoring occasions, in the same search space and with the same PDCCH candidate index. Each aggregated set of monitoring occasions may include k consecutive PDCCH monitoring occasions corresponding to the same search space. In one implementation, each monitoring occasion may belong to one aggregated set of monitoring occasions. In another implementation, each monitoring occasion may belong to multiple aggregated sets of monitoring occasions.

If the UE determines, at block 820 not to use the coverage-enhanced procedure, the UE may monitor for the PDCCH, at block 832, according to a second procedure, such as a non-coverage-enhanced procedure. The non-coverage-enhanced procedure may be without repetitions of the PDCCH in multiple monitoring occasions.

As illustrated in block 842, the UE may stop the monitoring for the PDCCH according to the coverage-enhanced procedure based on an elapse of a preconfigured duration of time. The preconfigured duration of time may be included in the configuration of the enhanced coverage procedure of PDCCH monitoring. Alternatively, as illustrated in block 844, the UE may stop the monitoring for the PDCCH according to the coverage-enhanced procedure in response to the deactivation of the coverage-enhanced procedure. The deactivation of the coverage-enhanced procedure may be included in another group-common DCI transmitted from the base station to the UE.

In some examples, the configuration that is received at block 805 may indicate a subset of search spaces for which the coverage-enhanced procedure can be activated. Then, at block 830, the UE may monitor for the PDCCH according to the coverage-enhanced procedure for each search space of the subset of search spaces based on the group-common DCI.

In some examples, the indication that is received at block 810 may indicate that the coverage-enhanced procedure is enabled, and in response, the UE may perform blind detection, at block 837, of the PDCCH based on the coverage-enhanced procedure and based on a non-coverage-enhanced procedure. As illustrated at block 807, the UE may receive a configuration for a second PDCCH associated with a non-coverage-enhanced procedure for PDCCH monitoring. The UE may stop the blind detection of at least one of the types of PDCCH, such as at block 839. For example, the UE may stop the blind detection of the second PDCCH in response to determining that a number of blind decodes or an amount of covered control channel elements (CCEs) satisfies a threshold.

The UE may monitor for the one or more repetitions of the PDCCH in a same search space of the multiple PDCCH monitoring occasions according to the coverage-enhanced procedure, such as described in connection with any of FIGS. 4-7. The multiple PDCCH monitoring occasions may be part of an aggregated set of monitoring occasions. Each monitoring occasion of the multiple PDCCH monitoring occasions may correspond to a single aggregated set of monitoring occasion, such as described in connection with FIG. 5. A monitoring occasion of the multiple PDCCH monitoring occasions may be grouped into at least two aggregated sets of monitoring occasions that overlap, such as described in connection with FIG. 6.

Each block in the aforementioned flowchart of FIG. 8A, FIG. 8B, or the aspects that are performed by the UE in any of FIG. 4 or 7, may be performed by a component of a UE apparatus that may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the UE may include means for performing any of the aspects of the method described in connection with FIG. 8A or 8B, or the aspects performed by the UE in FIG. 4 or 7. The aforementioned means may be one or more of the aforementioned components of an apparatus or a processing system of such an apparatus configured to perform the functions recited by the aforementioned means. The processing system may include a transmission processor, a reception processor, and a controller/processor. As such, in one configuration, the aforementioned means may be memory 360, such as the TX processor 368, the RX processor 356, or the controller/processor 359 configured to perform the functions recited by the aforementioned means.

Figure 9:
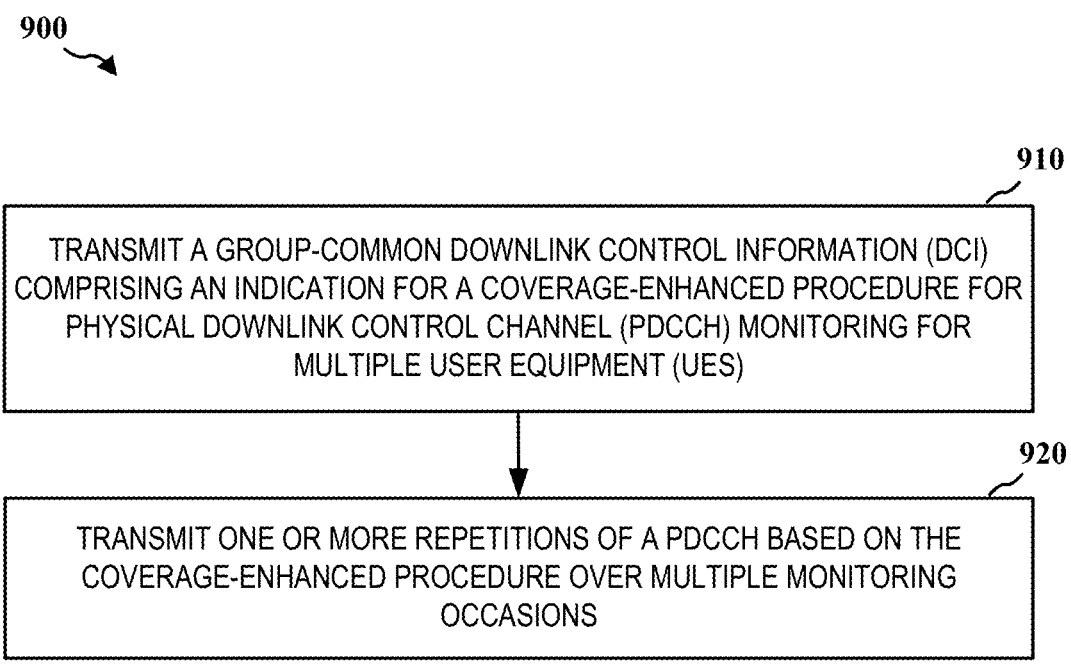
FIG. 9 shows a flowchart illustrating an example method performed by a base station that support a coverage-enhanced procedure for PDCCH monitoring, in accordance with various aspects of the present disclosure.

FIG. 9 is a flowchart illustrating a method 900 of wireless communication for a base station that supports coverage-enhanced procedures for PDCCH monitoring in accordance with various aspects of the present disclosure. The method 900 may be performed by a base station or a component of a base station (such as the base station 102, 180, 310, 402, 702; a processing system, which may include the memory 376 and which may be the entire base station 310 or a component of the base station 310, such as the TX processor 316, the RX processor 370, or the controller/processor 375). The method 900 illustrated in FIG. 9 may be performed by a base station in communication with a UE.

As illustrated in block 910 of FIG. 9, the base station may transmit a group-common DCI including an indication for a coverage-enhanced procedure for PDCCH monitoring for multiple UEs. The indication may include aspects described in connection with FIG. 4 or the group-common DCI 712 in FIG. 7. The base station may transmit the group-common DCI including the indication based on one or more of: channel state information received from at least one of the multiple UEs, a quality measurement for at least one of the UEs, or HARQ feedback from at least one of the multiple UEs. In some examples, the indication may indicate the coverage-enhanced procedure for all search spaces for the multiple UEs. In an implementation, the base station may transmit, prior to the group-common DCI, a configuration for multiple search spaces. The configuration may indicate a subset of search spaces for which the coverage-enhanced procedure can be activated. Then, the indication may activate the coverage-enhanced procedure for the indicated subset of search spaces. In another implementation, the base station may transmit the configuration along with the group-common DCI.

In one implementation, the group-common DCI indicates that the coverage-enhanced procedure is enabled, for example, and may possibly be used by the base station. The base station may configure the UE to monitor for a second PDCCH based on a non-coverage-enhanced procedure for PDCCH monitoring. The indication and the configuration may lead the UE to perform blind detections for both types of PDCCH procedures. The base station may configure the UE to stop the blind detection of the second PDCCH in response to determining that a number of blind decodes or an amount of CCEs satisfies a threshold.

As illustrated in block 920 of FIG. 9, the base station may transmit one or more repetitions of a PDCCH based on the coverage-enhanced procedure over multiple monitoring occasions. The one or more repetitions of the PDCCH may be grouped into one or more aggregated sets of monitoring occasions. A PDCCH may be repeated over PDCCH candidates in multiple monitoring occasions, in the same search space, and associated with or included in the same PDCCH candidate index. Each aggregated set of monitoring occasions may include repetition of the same PDCCH over two or more PDCCH monitoring occasions. A PDCCH may be repeated over PDCCH candidates in multiple monitoring occasions, in the same search space and with the same PDCCH candidate index. Each aggregated set of monitoring occasions may include k consecutive PDCCH monitoring occasions corresponding to the same search space. In one implementation, each monitoring occasion may belong to a single aggregated set of monitoring occasions, such as described in connection with FIG. 5. In another implementation, each monitoring occasion may belong to multiple overlapping aggregated set of monitoring occasions, such as described in connection with FIG. 6.

In one implementation, the base station transmits the one or more repetitions of the PDCCH based on a same PDCCH candidate index. In another implementation, the base station transmits the one or more repetitions of the PDCCH in a same search space of each of the multiple PDCCH monitoring occasions.

The coverage-enhanced procedure may expire based on an elapse of a preconfigured duration of time and the base station may stop transmitting one or more repetitions of the PDCCH based on the coverage-enhanced procedure over multiple monitoring occasions after the coverage-enhanced procedure expires. The base station may also determine that the coverage-enhanced procedure is no longer needed based on one or more of: channel state information received from at least one of the multiple UEs, a quality measurement for at least one of the UEs, or HARQ feedback from at least one of the multiple UEs. Then, the base station may transmit an additional group-common DCI deactivating the coverage-enhanced procedure.

Each block in the aforementioned flowchart of FIG. 9, or the aspects that are performed by the base station in any of FIG. 4 or 7, may be performed by a component of a base station apparatus that may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the base station may include means for performing any of the aspects of the method 900 described in connection with FIG. 9, or the aspects performed by the base station in FIG. 4 or 7. The aforementioned means may be one or more of the aforementioned components of an apparatus or a processing system of such an apparatus configured to perform the functions recited by the aforementioned means. The processing system may include a transmission processor, a reception processor, and a controller/processor. As such, in one configuration, the aforementioned means may be memory 376, such as the TX processor 316, the RX processor 370, or the controller/processor 375 configured to perform the functions recited by the aforementioned means.

According to additional aspects of the present disclosure, group-common downlink control information (DCI) may indicate coverage-enhanced CSI report settings for a group of UEs. In one example, the coverage-enhanced CSI report settings indicate a repetition of CSI reports. In these additional aspects, the base station 102 may include a group DCI component 198, such as described in connection with FIG. 1. The group DCI component 198 generates an indication of coverage-enhanced CSI report settings for a group of UEs. The UEs 104 may each include a coverage enhancement component 140, such as described in connection with FIG. 1, which enables the UE to determine an action to take regarding coverage-enhanced CSI report settings.

Figure 10:
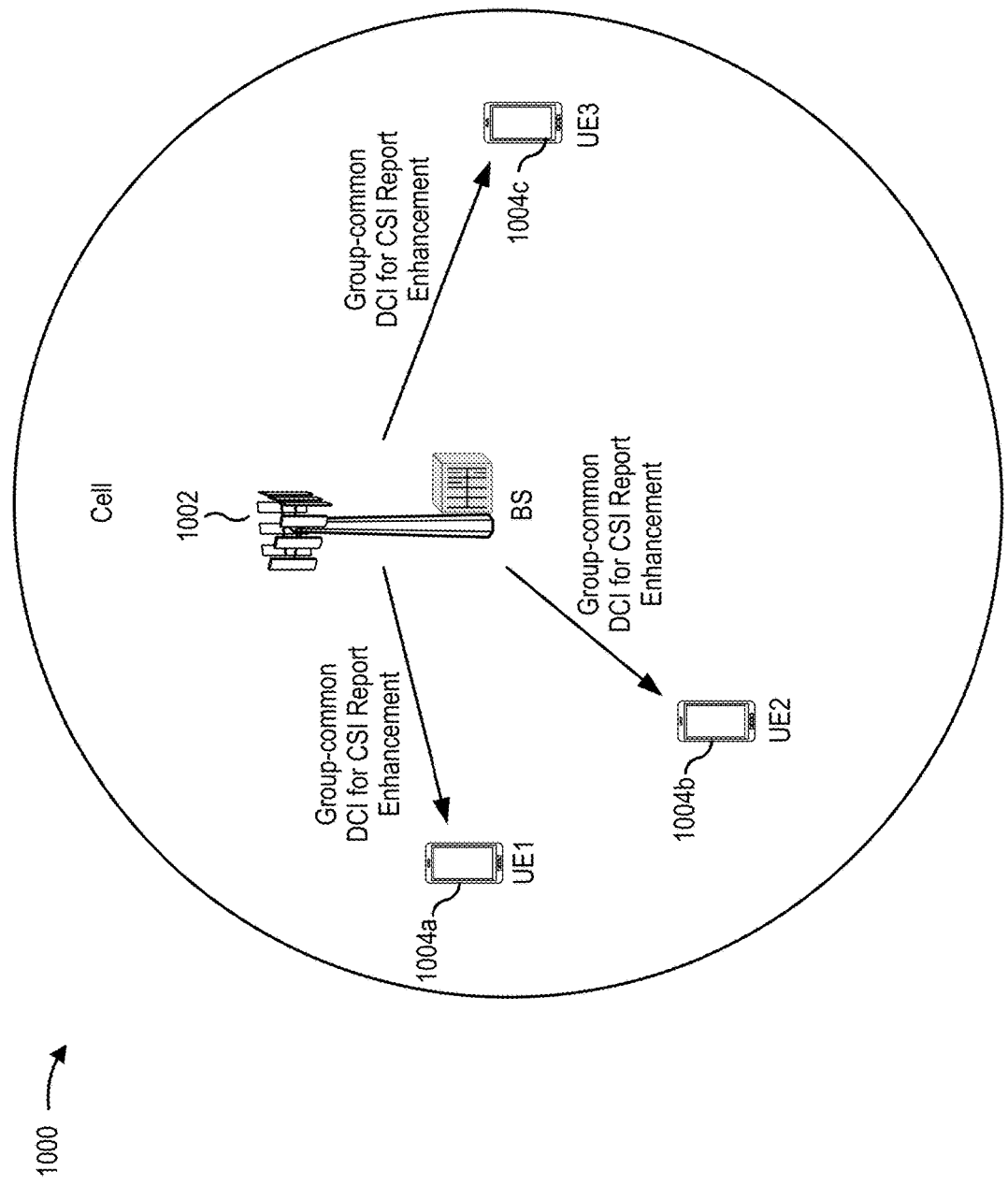
FIG. 10 is a block diagram conceptually illustrating an example of group-common downlink control information (DCI) for channel state information (CSI) report enhancement, in accordance with various aspects of the present disclosure.

FIG. 10 is a block diagram conceptually illustrating an example of group-common downlink control information (DCI) for channel state information (CSI) report enhancement, in accordance with various aspects of the present disclosure. As seen in FIG. 10, a wireless communications system 1000 includes a base station 1002. The base station 1002 transmits DCI to a group of UEs (e.g., UE1 1004a, UE2 1004b, and UE 3 1004c). The DCI indicates coverage-enhanced CSI report settings. FIG. 10 is provided merely as an example. Other examples may differ from what is described with regard to FIG. 10.

In one aspect, the group-common DCI activates the coverage enhancements, but does not provide details on the enhancement. The parameters for the enhancement may be defined separately in a CSI report configuration. In this case, each UE within the group may have a different type of enhancement, depending on their own configuration for CSI. In another aspect, the group-common DCI activates the coverage enhancements and also provides the parameters to the entire group.

In some aspects of the present disclosure, the coverage enhancement is valid until deactivation by explicit signaling. In other aspects, the coverage enhancement expires, for example, based on a timer. In still other aspects, the coverage enhancement is valid until implicit signaling is received. For example, a beam switch command may trigger the deactivation. In this case, the deactivation can occur immediately after receiving the beam switch command or at a predefined subsequent time.

The expiration may be different for different UEs based on a configuration of the CSI report. The expiration of coverage enhancement may also be different for different UEs based on the implicit signaling that triggers the deactivation. For example, a UE-specific beam change command for the UE1 1004a is sent before a beam switch command for the UE2 1004b, causing the UE1 1004a to deactivate the coverage-enhanced reporting before the UE2 1004b deactivates the coverage enhancement.

In an aspect of the present disclosure, coverage enhancement CSI reports may depend on configurations of each CSI report. For example, a UE configuration for the CSI reports may include multiple sets of parameters. A first set of parameters may correspond with legacy CSI reporting. A second set of parameters may be defined for enhanced reporting. Thus, when a UE receives the group-common DCI, the UE reports CSI in accordance with the second set of parameters. The methods for CSI report coverage enhancement may be different for each UE in the group, for example, when each UE has a different set of second parameters.

Different types of coverage enhancements of the CSI reports may be defined. One type of coverage enhancement may include CSI report repetition. Another enhancement may be additional (or alternative) time and/or frequency resources for CSI reporting.

Yet another type of coverage enhancement includes a smaller payload for the CSI report. For example, a subset of the number of beams may be included in a compact version of the layer one (L1) report. A first compact report may be designated for beams one and three, whereas a second compact report may be designated for beams two and four. The two compact reports replace a single full size report for all four beams. Alternatively, or in addition, a reduced bit resolution may be provided in the compact report (e.g., one bit instead of two bits). The smaller payload report may be sent with a different periodicity than a full size report. For example, a first report for beams one and three may be sent half as frequently as a legacy report.

Figure 11:
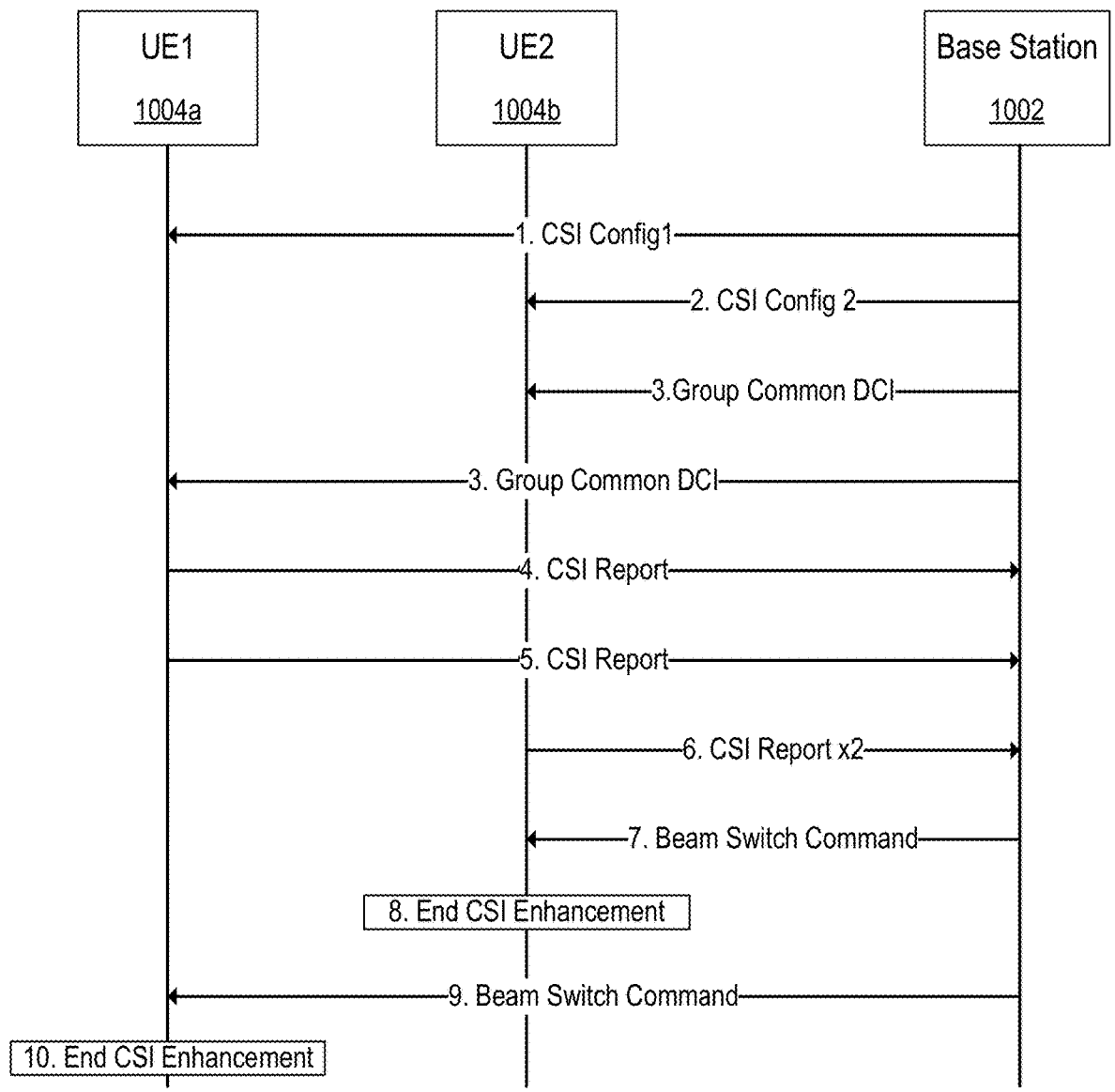
FIG. 11 is a call flow diagram showing a process for enabling and disabling channel state information (CSI) report coverage enhancement, according to aspects of the present disclosure.

FIG. 11 is a call flow diagram showing a process for enabling and disabling channel state information (CSI) report coverage enhancement, according to aspects of the present disclosure. At time 1, a base station 1002 transmits a CSI report configuration (CSI Config 1) to a first UE (UE1) 1004a. The CSI report configuration may include legacy parameters, as well as enhanced parameters. At time 2, the base station 1002 transmits a different CSI report configuration (CSI Config 2) to a second UE (UE2) 1004b. The CSI report configuration may include legacy parameters, as well as enhanced parameters. Until the report coverage enhancement is activated, the UEs 1004a, 1004b report in accordance with the legacy parameters.

At time 3, the base station 1002 transmits group-common DCI to both the UE1 1004a and UE2 1004b. Thus, the UE1 1004a and UE2 1004b will now report in accordance with the enhanced parameters. At time 4, the UE1 1004a transmits a first CSI report. In this example, the enhancement for UE1 1004a (from CSI Config 1) is to repeat reports in the time domain. Thus, at time 5, the CSI report is again transmitted to the base station 1002.

At time 6, the UE2 1004b transmits its CSI report in accordance with the enhanced parameters from CSI Config 2. In this example, UE2 1004b transmits with additional frequency resources. Thus, two CSI reports are transmitted at time 6, with different frequency resources.

At time 7, the base station 1002 transmits a beam switch command to the UE2 1004b. Subsequently, at time 8, the UE2 1004b stops reporting in accordance with the enhanced parameters and resumes reporting in accordance with the legacy parameters from CSI Config 2.

At time 9, the base station 1002 transmits a beam switch command to the UE1 1004a. Finally, at time 10, the UE1 1004a resumes reporting in accordance with the legacy parameters from the first CSI configuration (CSI Config 1).

FIG. 11 is provided merely as an example. Other examples may differ from what is described with regard to FIG. 11.

Figure 12:
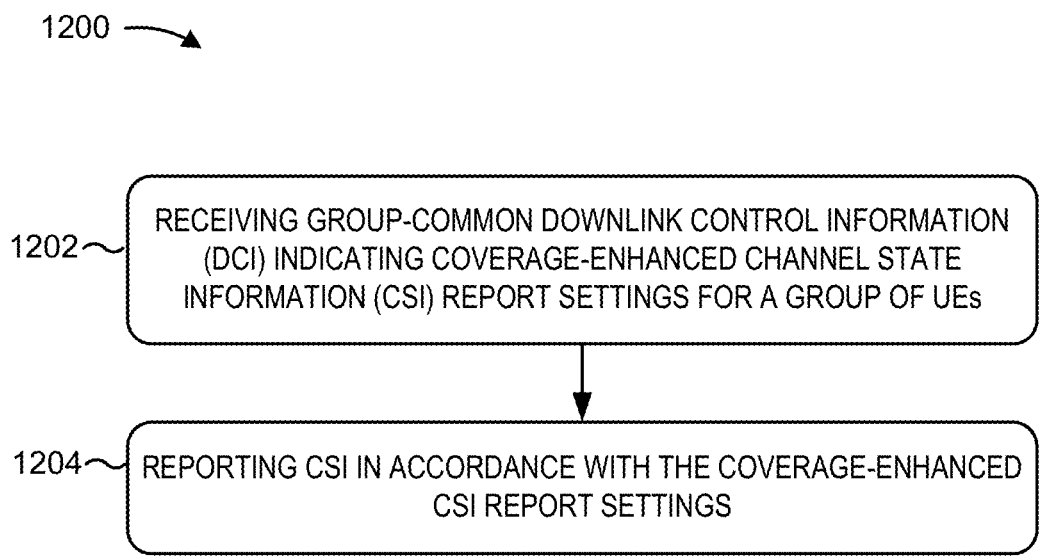
FIG. 12 is a flow diagram illustrating an example process performed, for example, by a UE (user equipment), in accordance with various aspects of the present disclosure.

FIG. 12 is a flow diagram illustrating an example process 1200 performed, for example, by a UE, in accordance with various aspects of the present disclosure. The example process 1200 is an example of receiving group-common downlink control information (DCI) indicating channel state information (CSI) report coverage enhancement.

As shown in FIG. 12, in some aspects, the process 1200 may include receiving group-common downlink control information (DCI) indicating coverage-enhanced channel state information (CSI) report settings for a group of user equipments (UEs) (block 1202). For example, the UE (e.g., using the antenna 352, demodulator 354, receive processor 356, controller/processor 359, and/or memory 360) may receive group-common DCI.

As shown in FIG. 12, in some aspects, the process 1200 may include reporting CSI in accordance with the coverage-enhanced CSI report settings (block 1204) For example, the UE (e.g., using the antenna 352, modulator 354, memory 360, controller/processor 359, and/or transmit processor 368) may report the CSI.

Figure 13:
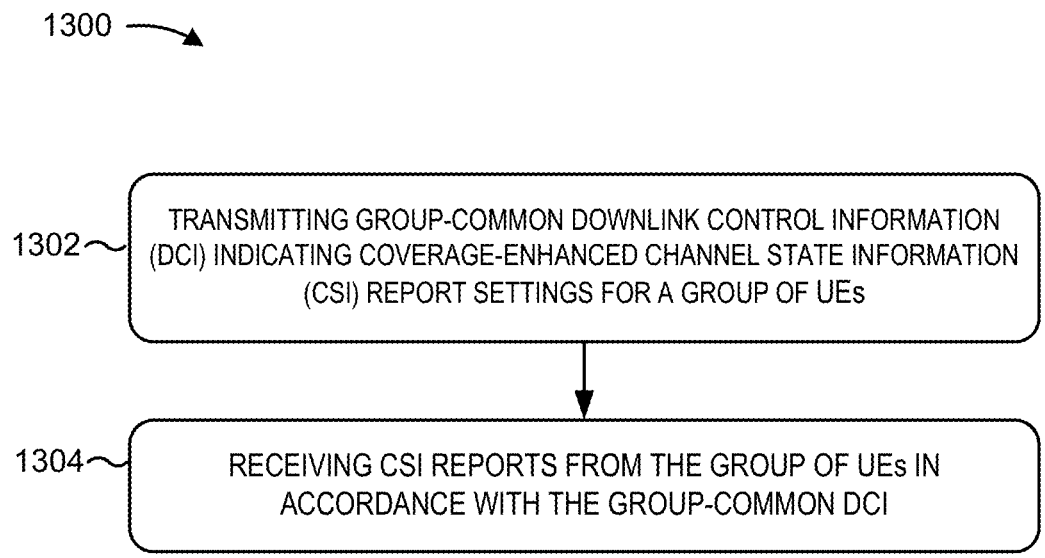
FIG. 13 is a flow diagram illustrating an example process performed, for example, by a base station, in accordance with various aspects of the present disclosure.

FIG. 13 is a flow diagram illustrating an example process 1300 performed, for example, by a base station, in accordance with various aspects of the present disclosure. The example process 1300 is an example of transmitting group-common downlink control information (DCI) indicating channel state information (CSI) report coverage enhancement.

As shown in FIG. 13, in some aspects, the process 1300 may include transmitting group-common downlink control information (DCI) indicating coverage-enhanced channel state information (CSI) report settings for a group of UEs (block 1302). For example, the base station (e.g., using the antenna 320, modulator 318, transmit processor 316, controller/processor 375, and/or the memory 376) can transmit group-common DCI.

As shown in FIG. 13, in some aspects, the process 1300 may include receiving CSI reports from the group of UEs in accordance with the group-common DCI (block 1304). For example, the base station (e.g., using the antenna 320, modulator 318, receive processor 370, controller/processor 375, and/or the memory 376) may receive CSI reports.

Implementation examples are described in the following numbered clauses.

1. A method of wireless communication by a UE (user equipment), comprising:
receiving group-common downlink control information (DCI) indicating coverage-enhanced channel state information (CSI) report settings for a group of UEs; and
reporting CSI in accordance with the coverage-enhanced CSI report settings.

2. The method of clause 1, further comprising stopping reporting CSI in accordance with the coverage-enhanced CSI report settings in response to expiration of a timer.

3. The method of clause 1, further comprising stopping reporting CSI in accordance with the coverage-enhanced CSI report settings in response to receiving a deactivation signal.

4. The method of clause 1, further comprising stopping reporting CSI in accordance with the coverage-enhanced CSI report settings in response to receiving implicit signaling.

5. The method of clause 4, in which the implicit signaling comprises a beam switch command.

6. The method of any of the preceding clauses, further comprising:
receiving, from a base station, a configuration for CSI reporting; and
determining the coverage-enhanced CSI report settings based on the configuration for CSI reporting.

7. The method of any of the clauses 1-5, further comprising determining the coverage-enhanced CSI report settings based on content of the group-common DCI.

8. The method of any of the preceding clauses, further comprising transmitting a first CSI report for a first subset of downlink beams and a second CSI report for a different second subset of downlink beams.

9. The method of any of the preceding clauses, further comprising transmitting the first CSI report with a different periodicity than the second CSI report.

10. The method of any of the preceding clauses, in which the coverage-enhanced CSI report settings comprises a number of CSI report repetitions.

11. A method of wireless communication by a base station, comprising:
transmitting group-common downlink control information (DCI) indicating coverage-enhanced channel state information (CSI) report settings for a group of UEs;
and receiving CSI reports from the group of UEs in accordance with the group-common DCI.

12. The method of clause 11, in which coverage-enhanced CSI reporting varies for different UEs of the group of UEs.

13. The method of clause 11 or 12, further comprising transmitting a configuration of the CSI reports to each UE of the group of UEs; in which expiration of coverage-enhanced CSI reporting varies for different UEs of the group of UEs in accordance with an expiration configuration of the CSI reports.

14. The method of any of the clauses 11-12, in which expiration of coverage-enhanced CSI reporting varies for different UEs of the group of UEs in accordance with implicit signaling or explicit signaling transmitted from the base station.

15. The method of any of the clauses 11-14, in which the coverage-enhanced CSI report settings indicate CSI report repetition.

16. The method of any of the clauses 11-15, in which the coverage-enhanced CSI report settings indicate additional time and/or frequency resources for the CSI reports or alternative time and/or frequency resources for the CSI reports.

17. The method of any of the clauses 11-16, in which the coverage-enhanced CSI report settings indicate a compact payload for the CSI reports, the compact payload comprising a reduced bit resolution or a report for a subset of beams.

18. The method of any of the clauses 11-17, further comprising receiving a plurality of split CSI reports at different periodicities.

19. The method of any of the clauses 11-18, in which the plurality of split CSI reports are for different subsets of beams.

20. A method of wireless communication at a user equipment (UE), comprising:
   receiving group-common downlink control information (DCI) comprising an indication for a coverage-enhanced procedure for a group of one or more UEs including the UE for physical downlink control channel (PDCCH) monitoring; and
   determining whether to monitor for a PDCCH according to the coverage-enhanced procedure based on the indication.

21. The method of clause 20, further comprising:
   receiving, prior to receiving the group-common DCI, a configuration of the coverage-enhanced procedure, in which the coverage-enhanced procedure comprises one or more repetitions of a same PDCCH over multiple PDCCH monitoring occasions.

22. The method of clause 21, in which the one or more repetitions of the PDCCH is associated with a same PDCCH candidate index.

23. The method of any of the clauses 20-22, further comprising monitoring for the one or more repetitions of the PDCCH in a same search space of the multiple PDCCH monitoring occasions according to the coverage-enhanced procedure.

24. The method of any of the clauses 20-23, in which the multiple PDCCH monitoring occasions are part of an aggregated set of monitoring occasions.

25. The method of any of the clauses 20-23, in which each monitoring occasion of the multiple PDCCH monitoring occasions corresponds to a single aggregated set of monitoring occasions or is grouped into at least two aggregated sets of monitoring occasions that overlap.

26. The method of any of the clauses 20-25, further comprising:
   responsive to determining to monitor for a PDCCH according to the coverage-enhanced procedure based on the indication, activating or continuing the coverage-enhanced procedure based on the indication; and
   monitoring for the PDCCH according to the coverage-enhanced procedure in response to the activating of the coverage-enhanced procedure.

27. The method of any of the clauses 20-26, in which the indication in the group-common DCI indicates the coverage-enhanced procedure is to be used for all search spaces for the UE.

28. The method of any of the clauses 20-26, further comprising:
   receiving, prior to receiving the group-common DCI, a configuration for a plurality of search spaces, in which the configuration indicates a subset of search spaces for which the coverage-enhanced procedure can be activated; and
   monitoring for the PDCCH according to the coverage-enhanced procedure for each search space of the subset of search spaces based on the group-common DCI.

29. The method of any of the clauses 20-28, in which the indication enables the coverage-enhanced procedure and the PDCCH is associated with the coverage-enhanced procedure, the method further comprising:
   receiving a configuration for a second PDCCH associated with a non-coverage-enhanced procedure for PDCCH monitoring; and
   performing blind detection for the PDCCH and the second PDCCH based on the coverage-enhanced procedure being enabled.

30. An UE (user equipment) for wireless communication, comprising means for performing a method of any of clauses 1-10 or 20-29.

31. A base station for wireless communication, comprising means for performing a method of any of clauses 11-19.

32. A non-transitory computer readable medium storing code for wireless communication, the code comprising instructions executable by a processor to perform a method of any of clauses 1-29.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a UE (user equipment), comprising:
 receiving group-common downlink control information (DCI) activating coverage-enhanced channel state information (CSI) report settings for a group of UEs; and
 reporting CSI in accordance with the activated coverage-enhanced CSI report settings, the reporting comprising transmitting a first CSI report for a first subset of downlink beams and a second CSI report for a different second subset of downlink beams.

2. The method of claim 1, further comprising stopping reporting CSI in accordance with the coverage-enhanced CSI report settings in response to expiration of a timer.

3. The method of claim 1, further comprising stopping reporting CSI in accordance with the coverage-enhanced CSI report settings in response to receiving a deactivation signal.

4. The method of claim 1, further comprising stopping reporting CSI in accordance with the coverage-enhanced CSI report settings in response to receiving implicit signaling.

5. The method of claim 4, in which the implicit signaling comprises a beam switch command.

6. The method of claim 1, further comprising:
 receiving, from a base station, a configuration for CSI reporting; and
 determining the coverage-enhanced CSI report settings based on the configuration for CSI reporting.

7. The method of claim 1, further comprising determining the coverage-enhanced CSI report settings based on content of the group-common DCI.

8. The method of claim 1, wherein a periodicity of the transmission of the first CSI report is different than a periodicity of the transmission of the second CSI report.

9. The method of claim 1, in which the coverage-enhanced CSI report settings comprises a number of CSI report repetitions.

10. A method of wireless communication by a base station, comprising:
 transmitting group-common downlink control information (DCI) activating coverage-enhanced channel state information (CSI) report settings for a group of UEs (user equipment), the coverage-enhanced CSI report settings varying for different UEs of the group of UEs; and
 receiving CSI reports from the group of UEs in accordance with the group-common DCI.

11. The method of claim 10, further comprising transmitting a configuration of the CSI reports to each UE of the group of UEs; in which expiration of coverage-enhanced CSI reporting varies for different UEs of the group of UEs in accordance with an expiration configuration of the CSI reports.

12. The method of claim 10, in which expiration of coverage-enhanced CSI reporting varies for different UEs of the group of UEs in accordance with implicit signaling or explicit signaling transmitted from the base station.

13. The method of claim 10, in which the coverage-enhanced CSI report settings indicate CSI report repetition.

14. The method of claim 10, in which the coverage-enhanced CSI report settings indicate additional time and/or frequency resources for the CSI reports or alternative time and/or frequency resources for the CSI reports.

15. The method of claim 10, in which the coverage-enhanced CSI report settings indicate a compact payload for the CSI reports, the compact payload comprising a reduced bit resolution or a report for a subset of beams.

16. The method of claim 10, further comprising receiving a plurality of split CSI reports at different periodicities.

17. The method of claim 16, in which the plurality of split CSI reports are for different subsets of beams.

18. A method of wireless communication at a user equipment (UE), comprising:
 receiving, prior to receiving group-common downlink control information DCI, a configuration of a coverage-enhanced procedure, the coverage-enhanced procedure comprising one or more repetitions of a same PDCCH over multiple PDCCH monitoring occasions;
 receiving the group-common DCI comprising an activation for the coverage-enhanced procedure for a group of one or more UEs including the UE for physical downlink control channel (PDCCH) monitoring; and
 determining whether to monitor for a PDCCH according to the coverage-enhanced procedure based on the activation.

19. The method of claim 18, in which the one or more repetitions of the PDCCH is associated with a same PDCCH candidate index.

20. The method of claim 18, further comprising monitoring for the one or more repetitions of the PDCCH in a same search space of the multiple PDCCH monitoring occasions according to the coverage-enhanced procedure.

21. The method of claim 18, in which the multiple PDCCH monitoring occasions are part of an aggregated set of monitoring occasions.

22. The method of claim 21, in which each monitoring occasion of the multiple PDCCH monitoring occasions corresponds to a single aggregated set of monitoring occasions or is grouped into at least two aggregated sets of monitoring occasions that overlap.

23. The method of claim 18, further comprising:
 responsive to determining to monitor for a PDCCH according to the coverage-enhanced procedure based on the activation, activating or continuing the coverage-enhanced procedure; and monitoring for the PDCCH according to the coverage-enhanced procedure in response to the activating of the coverage-enhanced procedure.

24. The method of claim 18, in which the activation in the group-common DCI indicates the coverage-enhanced procedure is to be used for all search spaces for the UE.

25. The method of claim 18, further comprising:
receiving, prior to receiving the group-common DCI, a configuration for a plurality of search spaces, in which the configuration indicates a subset of search spaces for which the coverage-enhanced procedure can be activated; and
monitoring for the PDCCH according to the coverage-enhanced procedure for each search space of the subset of search spaces based on the group-common DCI.

26. The method of claim 18, in which the activation enables the coverage-enhanced procedure and the PDCCH is associated with the coverage-enhanced procedure, the method further comprising:
receiving a configuration for a second PDCCH associated with a non-coverage-enhanced procedure for PDCCH monitoring; and
performing blind detection for the PDCCH and the second PDCCH based on the coverage-enhanced procedure being enabled.

27. A method of wireless communication at a base station, comprising:
transmitting, prior to transmitting group-common downlink control information (DCI), a configuration of a coverage-enhanced procedure, the coverage-enhanced procedure comprising one or more repetitions of a same PDCCH over multiple PDCCH monitoring occasions;
transmitting the group-common DCI comprising an activation for a coverage-enhanced procedure for a group of one or more user equipment (UEs) for physical downlink control channel (PDCCH) monitoring; and
transmitting one or more repetitions of a PDCCH based on the activated coverage-enhanced procedure over multiple monitoring occasions.

* * * * *